(12) United States Patent  (10) Patent No.: US 8,690,501 B2
Bullock                    (45) Date of Patent:    Apr. 8, 2014

(54) LOW-PROFILE WHEEL CHOCK ASSEMBLY (71) Applicant: Robert Lee Bullock, Loudon, TN (US)

(72) Inventor: Robert Lee Bullock, Loudon, TN (US)

(73) Assignee: Standard Car Truck Company, Park Ridge, IL (US)

( * ) Notice: Subject to any disclaimer, the term of this patent is extended or adjusted under 35 U.S.C. 154(b) by 0 days.

(21) Appl. No.: 13/712,810

(22) Filed: Dec. 12, 2012

(65) Prior Publication Data

US 2013/0156524 A1    Jun. 20, 2013

Related U.S. Application Data (60) Continuation of application No. 12/849,511, filed on Aug. 3, 2010, now Pat. No. 8,348,562, which is a continuation of application No. 12/383,416, filed on Mar. 24, 2009, now Pat. No. 7,824,138, which is a division of application No. 11/947,563, filed on Oct. 15, 2007, now Pat. No. 7,513,725.

(51) Int. Cl.
    B60P 7/08      (2006.01)

(52) U.S. Cl.
    USPC ......... 410/10; 410/9; 410/11; 410/12; 410/20

(58) Field of Classification Search
    USPC ............... 410/8–12, 19–20, 23, 97, 100, 103, 410/104, 49, 50; 188/32; 248/499
    See application file for complete search history.

(56) References Cited

U.S. PATENT DOCUMENTS

| | | |
|---|---|---|
| 1,424,957 A | 8/1922 | Tilburg |
| 1,776,935 A | 9/1930 | Snyder |
| 2,066,714 A | 1/1937 | Butterworth |
| 2,540,400 A | 2/1951 | McHenry |
| 2,705,081 A | 3/1955 | Jacobs |
| 2,730,400 A | 1/1956 | Francis |
| 2,771,162 A | 11/1956 | Marsh |
| 2,797,774 A | 7/1957 | Eckhart |
| 2,853,257 A | 9/1958 | Cook |
| 2,858,905 A | 11/1958 | Fahland |
| 2,895,569 A | 7/1959 | Nystrom |
| 3,119,350 A | 1/1964 | Bellingher |
| 3,581,846 A | 6/1971 | Janus |
| 3,605,954 A | 9/1971 | Wakabayashi et al. |
| 3,739,906 A | 6/1973 | Cwycyshyn et al. |
| 3,895,587 A | 7/1975 | Bell |
| 4,024,820 A | 5/1977 | Hlinsky et al. |
| 4,031,983 A | 6/1977 | Lentini |
| 4,032,167 A | 6/1977 | Chereda |
| 4,060,036 A | 11/1977 | Palms |
| 4,316,686 A | 2/1982 | Cottrell et al. |
| 4,343,401 A | 8/1982 | Paulyson |
| 4,399,893 A | 8/1983 | Switzer |
| D281,063 S | 10/1985 | De Raad |
| 4,611,961 A | 9/1986 | Van Iperen et al. |
| 4,615,416 A | 10/1986 | Wilson |
| 4,659,266 A | 4/1987 | Thelen et al. |

(Continued)

Primary Examiner — Stephen Gordon
(74) Attorney, Agent, or Firm — Neal, Gerber & Eisenberg LLP (57) ABSTRACT A wheel chock body for a wheel chock that has low elevational profile. The low profile of a wheel chock allows it to be positioned under a vehicle the rocker panel of which has its lower edge only 148 mm (5.82 inches) above the surface upon which the vehicle's tire rests, so that the installed chock height is reduced to 47.6 mm (1.87 inches) under the components of the vehicle's body.

44 Claims, 9 Drawing Sheets

(56) References Cited

U.S. PATENT DOCUMENTS

| | | |
|---|---|---|
| 4,668,140 A | 5/1987 | Blunden |
| 4,676,344 A | 6/1987 | Locicero |
| 4,695,087 A | 9/1987 | Hollrock |
| 4,786,223 A | 11/1988 | Crissy et al. |
| 4,804,070 A | 2/1989 | Bohler |
| 4,836,726 A | 6/1989 | Robertson et al. |
| 4,838,743 A | 6/1989 | Blunden et al. |
| 4,875,813 A | 10/1989 | Moyer et al. |
| 4,960,353 A | 10/1990 | Thorndyke |
| 4,971,492 A | 11/1990 | Moyer et al. |
| 5,037,255 A | 8/1991 | Bullock et al. |
| 5,106,245 A | 4/1992 | Fritz et al. |
| 5,160,223 A | 11/1992 | Seitz |
| 5,302,063 A | 4/1994 | Winsor |
| 5,312,213 A | 5/1994 | Winsor |
| 5,316,421 A | 5/1994 | Bullock et al. |
| D402,616 S | 12/1998 | Henry |
| D415,463 S | 10/1999 | Henry |
| D420,640 S | 2/2000 | Henry |
| D422,960 S | 4/2000 | Henry |
| 6,164,893 A | 12/2000 | Glomot et al. |
| D474,729 S | 5/2003 | Sargent |
| D489,310 S | 5/2004 | Olson et al. |
| 6,835,034 B2 | 12/2004 | Winsor |
| 6,851,523 B1 | 2/2005 | Gaster |
| 6,926,480 B2 | 8/2005 | Anderson et al. |
| D511,734 S | 11/2005 | Moore et al. |
| D516,268 S | 2/2006 | Gaster |
| 7,004,696 B2 | 2/2006 | Anderson et al. |
| 7,128,508 B2 | 10/2006 | Anderson et al. |
| 7,150,592 B2 | 12/2006 | Anderson et al. |
| D543,926 S | 6/2007 | Kutzler |
| D547,712 S | 7/2007 | Hartmann |
| D587,183 S | 2/2009 | Blumenthal et al. |
| 7,513,725 B1 | 4/2009 | Bullock |
| 7,824,138 B2 | 11/2010 | Bullock |
| 8,348,562 B2 * | 1/2013 | Bullock .................. 410/10 |
| 2009/0208304 A1 | 8/2009 | Bullock |

\* cited by examiner

LOW-PROFILE WHEEL CHOCK ASSEMBLY

PRIORITY CLAIM

This application is a continuation of, claims priority to, and the benefit of U.S. patent application Ser. No. 12/849,511, filed Aug. 3, 2010, now U.S. Pat. No. 8,348,562, which is a continuation of, claims priority to, and the benefit of U.S. patent application Ser. No. 12/383,416, filed on Mar. 24, 2009, now U.S. Pat. No. 7,824,138, which is a divisional of, claims priority to, and the benefit of U.S. patent application Ser. No. 11/974,563, filed on Oct. 15, 2007, now U.S. Pat. No. 7,513,725, the entire contents of which are incorporated herein by reference.

FIELD OF THE INVENTION

This invention relates to a wheel chock assembly which secures a vehicle in a carrier or transporter in which the vehicle is transported. The wheel chock includes a wheel harness to restrain the vehicle by securing its wheels to the floor of the carrier. A typical carrier is a railway car or a ship. Each wheel chock of the assembly is specifically designed and constructed for installation on a rail, one chock positioned in front of a vehicle's wheel and the other chock behind the wheel. As used herein, the term "wheel" refers to the combination of a wheel rim and a tire mounted thereon. The goal is to restrain a current "low-drag" automobile adequately without damaging components in its wheel-well despite the clearance between the automobiles fenders and rocker panels being restricted by the requirements of "low drag".

BACKGROUND OF THE INVENTION

Wheel chocks for restraining the movement of a motor vehicle in a carrier such as railroad cars are well known. An automobile may be held with wheel chocks in a container or cage, the floor of which is provided with a mounting rail, chock tie-down rail, or guide-rail, hereafter referred to as a "chock-rail". Irrespective of how the automobile is to be transported, it is transported in a transportable carrier. More specifically, wheel chocks (hereafter, for brevity, "chocks") such as are disclosed in U.S. Pat. Nos. 4,875,813; 5,037,255; and 5,316,421 (hereafter the "'813", "'255" and "'421" patents, respectively) are currently in wide use to chock automobiles being transported; though these chocks may have bodies cast from a light metal alloy, typically an aluminum or magnesium alloy, or aluminum, they are currently molded from a synthetic resinous material (or "plastic" for brevity). The molded chocks are highly successful to chock most automobiles and pick-up trucks currently manufactured and transported in interstate commerce.

To date, the bodies of all '813 and '421 wheel chocks made and used in commerce have been molded from plastic, because it is more economical and practical to do so, it being understood that a metal body could be cast and used provided it meets the requirements of strength and stiffness with the maximum thickness stated hereafter. The reason the '813 and '421 chocks are unsuitable for a large number of passenger automobiles currently marketed is that, recently, these automobiles afford inadequate clearance for manually installing and removing the chocks in the front and rear wheel-wells (defined by the vehicle's front and rear fenders respectively).

In particular, the design and construction of the monolithic bodies of the chocks disclosed in the '813, '255 and '421 patents are highly desirable because these chocks allow the harness to be tightened and loosened on a torque tube which lies above a chock-rail to which the chock is secured. However, strength and stiffness considerations require that the elevational profiles of the molded bodies of the '813, '255 and '421 chocks be so high as to all but preclude manually installing each chock under a current "low-drag" automobile without damaging its adjacent body components. In addition to the confined space around the wheel of a "low drag" vehicle, making it difficult to deploy a wheel harness over the tire, and wheel chocks in front of and to the rear of a wheel, the height of the chock's molded body makes it difficult to chock a wheel without damaging wheel-well components which come in contact with either the chock body or the elongated restraining element ("strap" or "belt") of its wheel harness under the dynamic conditions encountered while the vehicle is transported.

It is known that a current "low-drag" automobile can be adequately restrained if either the '421, '255 or the '813 chocks could be positioned against a wheel around which there is enough clearance above the chock to avoid damaging components of the automobile, but in many current automobiles this clearance is lacking. Damage to components of a fender well was caused not only by impact with the body of the wheel chock, but also by impact with the strap used to secure the wheel to the deck of the transporter. The difficulty lay in the redesign of the molded or cast body using a strap, so as to provide the desired clearances to avoid damaging components of the automobile when automobile is substantially static and when it is jolted during transport (dynamic conditions).

Since molding the body from an engineering plastic is more economical than casting it from metal, molding the body required configuring structural details so that they could be unitarily molded to have the required strength and stiffness within the limitations imposed by the process used to mold the chock's body from an engineering plastic of choice.

The Problem:

Automobiles are currently designed to coax maximum distance (mileage) out of a unit volume of fuel. The less the drag, the better the mileage. It has been found that reducing the clearance between the vehicle's wheel and body, the wheel well clearance, and/or reducing the ground clearance between the vehicle's body and ground reduces air turbulence and provides lower aerodynamic vehicle drag. The resulting "low-drag" design utilizes a body shape with fenders and rocker panels which are only 148 mm (5.82"), or even lower, above the ground on which the automobile rests. Therefore the novel chock was required to have a maximum height, at any cross-section, of 12.7 cm (5.0 ins), preferably no greater than 11.7 cm (4.6"), so as to fit under rocker panels, "ground-effects" components and stone guards of current low-drag designs and those reasonably foreseeable in the future.

In addition, the space around the tire of a wheel in a wheel-well is so restricted that it is difficult to manipulate a conventionally used '813 or '421 wheel harness which is to be hooked with straps to be wrapped around a torque tube in a wheel chock. The inner panels of the wheel-well are so close to the tread of a tire that the pending straps of a wheel harness used in combination with prior art wheel chocks, scuff and damage the inner panels. Such damage is exaggerated when a carrier is jolted and the vehicle suffers a dynamic shift resulting with a taut strap having an impact on an inner panel. The highly desirable use of a strap to secure a wheel to the deck with a wheel chock required that the damage attributable to the strap, when tightened, be minimized if not negated.

Though the interchangeability of each '813 or '421 chock is a desirable practical convenience, it decreed that rotation of the torque tube be in the same direction to tighten the straps.

As a result, when the straps on each side of a wheel are taut, at least one strap is forced against an inner panel of the "low-drag" wheel-well under the slightest movement of the vehicle, resulting in damage to the panel. Major vehicle manufacturers have defined a three sided "safe zone" wherein the "chocking surface" and the strap and the point at which the strap is wrapped on the torque tube, must all be confined during static and dynamic loadings. The "chocking surface" is the angled surface against which the tire is biased when the strap is tightened. The sides of the safe zone are defined by (i) the arcuate surface of the tire tread from where it meets the deck up to the wheel's horizontal center line, (ii) a vertical plane from the tangent at the wheel's horizontal center line to the horizontal plane of the deck's surface and (iii) the deck surface intersecting the first two sides. The vertical plane defines the longitudinal limit of the safe zone specified by General Motors Corporation. The volume of the safe zone is directly proportional to the size of the wheel. Small wheels have small safe zones, large wheels have large safe zones.

There is a second zone, referred to as the "deck zone", that is defined by a horizontal boundary plane not more than 2 inches (50.8 mm) above the deck surface upon which the wheel rests, and the deck surface, the plane extending fore and aft of the safe zone. The wheel chock is required to meet the requirements of the limits set forth in both the safe zone and the deck zone. Because of the tight confines of the safe zone, it was found essential that each strap, when tightened to secure the strap over a wheel, must be within the three sided safe zone when taut, so as to avoid scraping the inner panels. The safe zone is defined relative to the tire, so that when the tire is displaced dynamically (when the secured automobile is jolted), the safe zone is also displaced.

The high probability of such damage is not avoided by blocking the tires of a vehicle, typically by rolling the wheel onto a wood block about 45 mm (1.75 in) thick, raising the wheel's horizontal center line so as to increase the safe zone and to get adequate clearance above the deck floor, before securing the wheel in the wheel harness. With such a "quick-fix", during transport of the vehicle, it is likely to be jolted with sufficient force to have the wood block ejected from under a wheel, resulting in damage. Therefore it was required that the novel chock not only be easily and reliably installed on a chock-rail, but also that the chock's molded body maximize the vertical and longitudinal clearance under dynamic conditions expected to be encountered during transport of the automobile.

Moreover, the '813 and '421 wheel harnesses required using a J-hook to secure the wheel. Manually manipulating each J-hook was found to be not only unexpectedly difficult in the tight confines of the wheel-well, but also likely to result in scratches to body components. When two "active" wheel chocks are to be used, a hookless wheel harness was required. By "active" wheel chock is meant one with a ratchet gear assembly used to tighten a strap wound around the chock's torque tube. By "hookless harness" is meant a harness which does not require assembly with hooks. In particular, a multi-component harness requiring J-hooks, or some other metal fastening means to assemble portions of the harness after one or more of the portions was deployed over the wheel, was specifically proscribed. When a single active wheel chock is to be used in combination with an anchor wheel chock, a hook or other tube engaging and securing means is required to secure one end of the strap to an anchoring element in the anchor chock. A rod, strut or tube in the anchor chock provides a convenient anchoring element. To distinguish the rod, strut or tube used as an anchoring element in an anchor chock from the torque tube used in an active chock (because the torque tube may be used as the anchoring element), the anchoring element is referred to hereafter as a rod, though it will be appreciated that a tube would be preferred.

Since desirable features of the '813 and '421 chocks, namely their operability from outside the chock-rail, by an installer facing one side of the automobile, of both the wheel-securing ratchetable torque tube (harness-tightening and loosening mechanism to tighten and loosen the ends of a harness strap) and the locking mechanism (to lock the chock to the rail), proved to be exceptionally effective, it was decreed that a molded or cast body be configured to house these features in an active chock. Since the torque tube in the prior art chocks lay above the chock-rail, a new design mandated that this position of the torque tube be retained. The active wheel chocks and anchor chock are required to be installed on any chosen "standard" chock tie-down rail; the standard in the U.S. is set by the AAR (American Association of Railroads).

Still further, since a practical wheel chock mandates a molded plastic body or a cast aluminum or light alloy body, to avoid damage to a vehicle's body components, it is necessary to construct a monolithic body with thin stiffening ribs or webs. Any peripheral wall of the body, or any internal stiffening rib or web thicker than 15.9 mm (0.625 in) thick cannot currently be either reliably or reproducibly injection-molded from an engineering plastic or cast from a light metal. Further, because any external stiffening rib, projecting outwardly from the smooth exterior surfaces of the chock's body, will add to the critical external dimensions of the wheel chock and increase the likelihood of damage caused by the projecting rib, it is essential that no such external stiffening rib be used in a low profile chock.

SUMMARY OF THE INVENTION

Desirable components of prior art '813 and '421 chocks, namely the wheel-securing ratchetable torque tube and the chock-locking mechanism (to the chock-rail) are unexpectedly found to be adaptable to solve the problem so long as the monolithic body of the chock is redesigned for use in a pair of low-profile, non-interchangeable chocks, the body of one constructed in mirror-image relationship to the other. The term "body" refers to a chock, as molded, without the through-apertures in which metal components which make the chock operable, are mounted. As will presently be evident, even after a ratchetable torque tube and complementary metal components are fitted to each molded body of a pair of active chocks, each chock, without its locking mechanism for locking the chock to the chock-rail, is also a mirror-image of the other. The body of the anchor chock is a mirror image of the active chock with which it is to be used, except that the anchor chock need not be provided with the through apertures for mounting a non-existent ratchet gear assembly.

Because the sole function of the locking mechanism is to lock each chock to the chock-rail, the locking mechanism used on each chock, whether active or anchor, is identical for economic reasons only. As a result, each completed chock, with its locking mechanism, is no longer a mirror image of the other.

The low profile of each chock having a maximum height of 12.7 cm (5.0") within the safe zone, and a maximum height no higher than 5.08 cm (2.0 inch) within the deck zone, is essential to avoid damage to the rocker panels and other components of current "low-drag" vehicles, particularly to those components adjacent to, or defining, the vehicle's wheel-wells.

An assembly of first and second active wheel chocks, the body of one a mirror-image of the other, are placed in contact with a tire, front and rear of a wheel to be restrained, in combination with a hookless harness. The harness includes an elongated strap which is deployed on opposed sides of the tire. When using two active chocks, the end of each strap is wrapped around a torque tube in each chock. When using one active chock and one anchor chock, one end of the strap is wrapped around the torque tube of the active chock, and the other end of the strap is provided with a hook which is hooked around a rod in the anchor chock. The rod may be the same tube used in an active chock, except that the slit (for insertion of the end of the strap in an active chock) is unnecessary if the hook is to be hooked around the tube and not in the slit.

Both chocks are locked to a chock-rail with a locking mechanism disclosed in the '813 and '421 patents. The torque tube in the first chock is rotated in a clockwise direction to tighten one end of the strap; the torque tube in the second chock is rotated in a counter-clockwise direction to tighten the other end of the strap; in each case, the torque tube lies above the chock-rail and rotation of the torque tube is effected with a ratchet from outside the chock-rail. The ratchetable torque tube and locking mechanisms are disclosed in the '813 and '421 patents.

Each novel wheel chock has a monolithic molded body including a generally rectangular, elongated, stepped-box portion integrally formed with a relatively short, terminal rectangular box portion referred to as the "heel", common to both the upper and lower portions, at one end of the stepped-box. The stepped-box portion comprises an upper portion, within the safe zone, in which upper portion a torque tube is journalled, and a lower portion within the deck zone, to strengthen and stabilize the chock body. One end (the "interior" end) of the stepped-box portion, referred to as the "toe", has parallel side walls and no end-wall, and each corner of each side is rounded to avoid having a sharp corner which is likely to be captured in a through-aperture in the deck of the transporter. The exterior wall at the "outer" end of the rectangular box portion (of the heel), provides an exterior end-wall of the monolithic body.

The heel and stepped-box portion share a common vertical interior longitudinal web (or wall) in which a torque tube or rod is to be journalled, and this common wall in combination with additional plural longitudinal and transverse internal webs, all of which are vertical, provide the necessary strength and stiffness to the body of the wheel chock, but longitudinal webs also allow the torque tube or rod to be journalled in them. It will be readily understood that the function of the network of webs is to provide requisite strength and rigidity, and support for the torque tube or rod. For production reasons, it is economical and practical to use a network of webs in one chock which is a mirror-image of the network of webs in the other. This does not preclude using a network of webs in one chock which is not a mirror-image of the network of webs in the other, because of insignificant changes in the positioning of some of the webs, since this is possible but not economical, so long as the function of the network of webs in each chock is fully met.

The longitudinal direction is along the y-axis, the direction along which the chock-rail lies; the transverse direction is along the x-axis which is at a right angle (orthogonal) to the y-axis; and height is measured along the z-axis.

It is essential that for economic reasons, two chocks, the body of one being substantially a mirror image of the other, be used in the chock assembly. The assembly of active chocks provides oppositely rotatable torque tubes which tighten the opposed straps of a hookless harness so that the taut straps are positioned within the safe zone, and tangentially relative to the surface of a tire being secured.

Each active wheel chock is secured to a chock-rail affixed to the floor by stepping down on a locking handle of the locking mechanism and then tightening the strap by turning the torque tube with a ratchet. Each chock is released by stepping down on the ratchet unlocking lever of the ratchet wheel (or ratchet gear) assembly. The unlocking lever is forced against the locking pawl so as to release the ratchet wheel secured to the torque tube, near its end. This is readily accomplished because the stored energy, from preloading the strap during installation, automatically provides the energy required to release the strap, when the locking pawl releases the ratchet wheel. This quick and easy method of loosening the strap avoids the manual labor required to loosen the strap using a ratchet. The chock can then be removed from the rail by manually pulling up on the locking handle. The stepped-box configuration provides a low elevational profile within both the safe zone and deck zone, the highest surface being that of the upper surface of the rectangular box portion ("heel") of the body. The upper surface of the heel is typically about 4.5 ins (114.3 mm) above the surface of deck or floor on which the vehicle rests. The low profile makes it possible to deploy each wheel chock beneath a fender of a "low-drag" vehicle even when the fender's lower edge is only 148 mm (5.82") above the floor. The low profile also allows for maximum dynamic displacement without sacrificing the strength (of the chock body) required to allow each chock to sustain unexpectedly high shocks suffered during transport. In addition, the chocks allow for about 1.375" (35 mm) fore and aft movement of the vehicle under such shocks while within the safe zone. The installed chock height under the components of the vehicle's body is reduced to 47.6 mm (1.87").

Since it was found that only a substantially fully polymerized synthetic "engineering" resin having high strength characteristics may be used to integrally injection-mold the webbed stepped-box portion and heel of the novel chock's body, it is found necessary to limit the thickness of each internal web and each peripheral wall of the chock's body to a thickness of no more than 15.9 mm (0.625"), preferably in the range from about 3.175 mm (0.125") to 12.7 mm (0.50"). By "substantially fully polymerized" is meant that the polymer has less than 5% monomer present, preferably less than 2%.

The clearance of 148 mm is dictated by the current design and construction of "low-drag" motor vehicles which maximize the mileage obtained during operation of the vehicle. The first (or front) chock is not interchangeably usable with the second (or rear) chock, but the corresponding dimensions of each component, in elevational profile, are the same.

Though the monolithic body of each chock has an open bottom and is hollow, its structural strength derives from a network of connected internal vertical webs, longitudinal webs (along the y-axis) being orthogonally disposed relative to the transverse webs (along the x-axis). In this network, each of a series of transversely spaced-apart webs extends along the longitudinal axis, connecting the inner surface of one vertical side wall of the monolithic body to the inner surface of its opposite sidewall; and, each of a series of longitudinally spaced-apart transverse webs extends between adjacent longitudinal webs; all webs being integrally formed with the body.

The strength and rigidity of the monolithic body is enhanced by a pair of metal plates on two adjacent longitudinal webs, through which webs-locking pins are tightly secured, effectively prestressing the body of the chock with the two adjacent webs.

A single window in the upper portion of the stepped-box of each active chock, provides access for a hookless strap of a tire harness, which strap is wrapped around each torque tube having a transverse slit in it to afford purchase for one end of each strap. It is essential, with both active chocks, that hooks on straps of the prior art harness, such as the one used in the '421 wheel chock assembly, be eliminated because it is difficult and time-consuming to manipulate a tire harness with its straps and hooks to secure the tire between the wheel chocks. A hookless wheel harness is one in which no hook in a strap is to be connected to an intermediate portion of the wheel harness to use the harness. A hookless harness allows enough space for the hands of a person to position the harness on the tire directly above the wheel, though there may be insufficient space to insert a hand on either side of the wheel, that is, between the wheel and its adjacent inner panel.

A hook at only one end of a strap used as a wheel harness can readily be hooked around the rod of an anchor chock as there is much more room to do so.

As in the prior art, each first chock (front of the wheel) and second chock (rear of the wheel) is adapted to be connected to a selected location on the chock-rail fastened to the floor of the carrier. The assembly of a pair of chocks is installed with the wheel harness which connects them, and locked to the chock-rail by the locking mechanism on each chock, using no tools; and each chock may be removed from its locked position on the chock-rail using no tools. A ratchet is used to tighten the strap on an active torque tube.

In an assembly of two active chocks, the first chock in front of a wheel, the left chock, includes a first torque tube for winding up a first end of a strap of the wheel harness to tighten the tire against the carrier's deck, the first torque tube rotating clockwise; and, the second chock behind the wheel, includes a second torque tube for winding up a second end of the strap of the wheel harness to tighten the tire against the carrier's deck, the second torque tube rotating counter-clockwise; and each chock is provided with a foot-operated actuating lever (locking handle) for locking the chock to the rail with identical locking mechanisms.

Unlike the prior art in which the torque tube in each chock rotates clockwise, it is the oppositely rotating torque tubes which provide the clearance of the taut straps relative to adjacent body components.

It will be evident from the foregoing, that when the hookless wheel harness is a strap, preferably provided with cleats, or tire-engaging blocks with cleats, intermediate its ends, which strap is symmetrically disposed on the circumferential surface of the tread of the tire, the cleat at the center of the harness is directly above the center (in the 1200 o'clock position) of the wheel. The wheel chocks disclosed in the '813 and '421 patents require that the strap be wound in the same clock-wise direction, so that the strap was wound on the same side of the torque tube. The assembly of a pair of active wheel chocks disclosed herein, provides a pair of chocks, each of which includes a harness tightening and loosening means and a hookless harness, the strap of which is operably trained over the tire so that, together, the two chocks maintain the center cleat in the preferred 1200 o'clock position. Each chock is locked to the chock-rail and the terminal portions of the harness's straps are wound on opposed "wrap surfaces" of the two torque tubes. The inner surface of the torque tube, that is, the surface nearest the tread on which surface wrapping the strap commences, is referred to as the "wrap surface". The assembly is therefore a pair of "active" wheel chocks.

When an assembly comprising a pair of chocks, one active, and one an anchor chock is used, plural cleated tire blocks may not be symmetrically disposed over the tread of the tire, and typically are not. However, it is essential that at least two cleated tire blocks engage the tread on opposed sides of a vertical center line through the tire, preferably three or more, at least one being on one side of the vertical center line.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
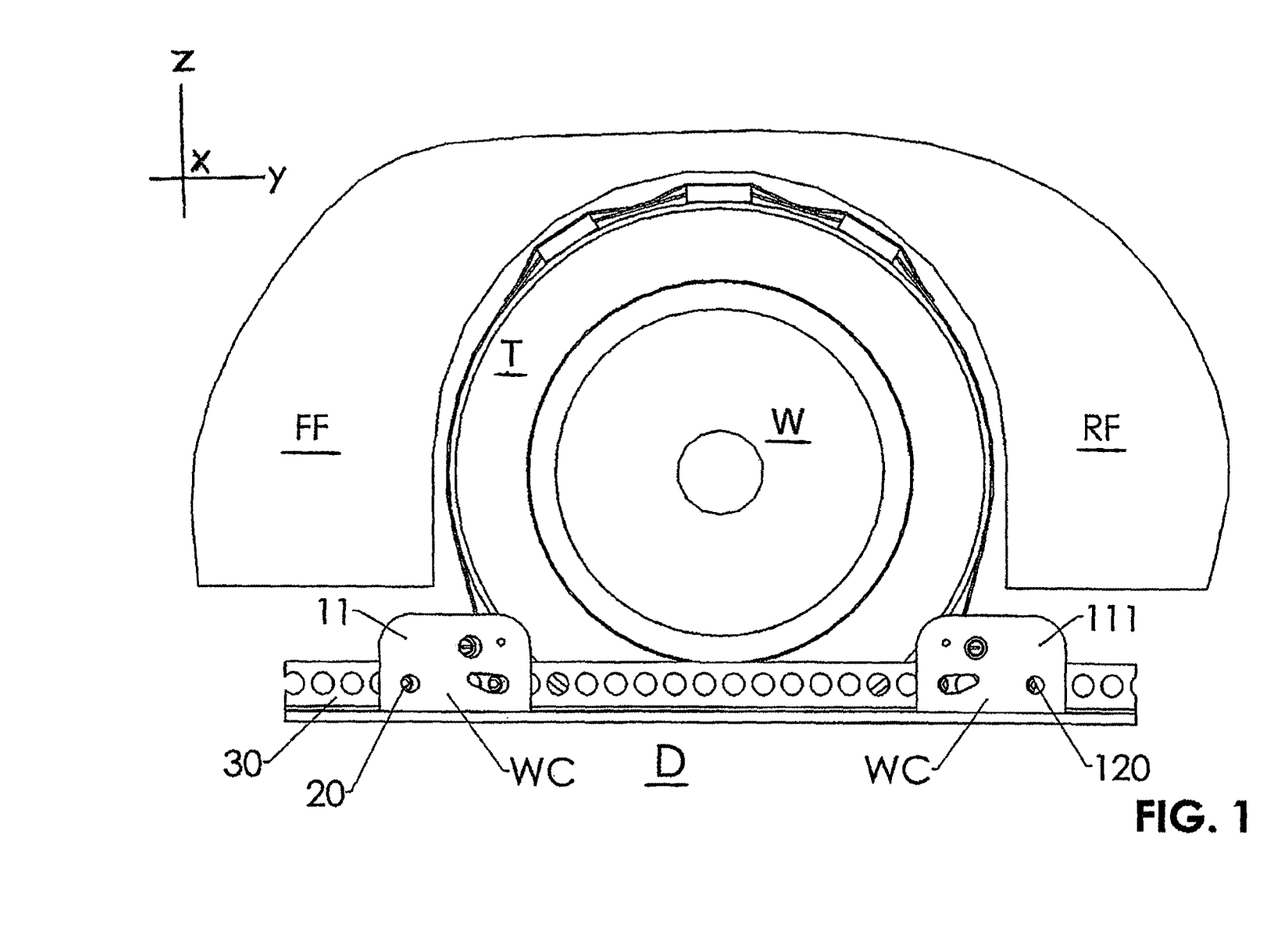
FIG. 1 is a schematic illustration, in a side elevational view in the direction of the transverse axis (x-axis), of a wheel chock assembly of a pair of active chocks, showing first (left) and second (right) chocks locked to a standard chock-rail, front and rear respectively, of a tire of a vehicle in a carrier.
Figure 2:
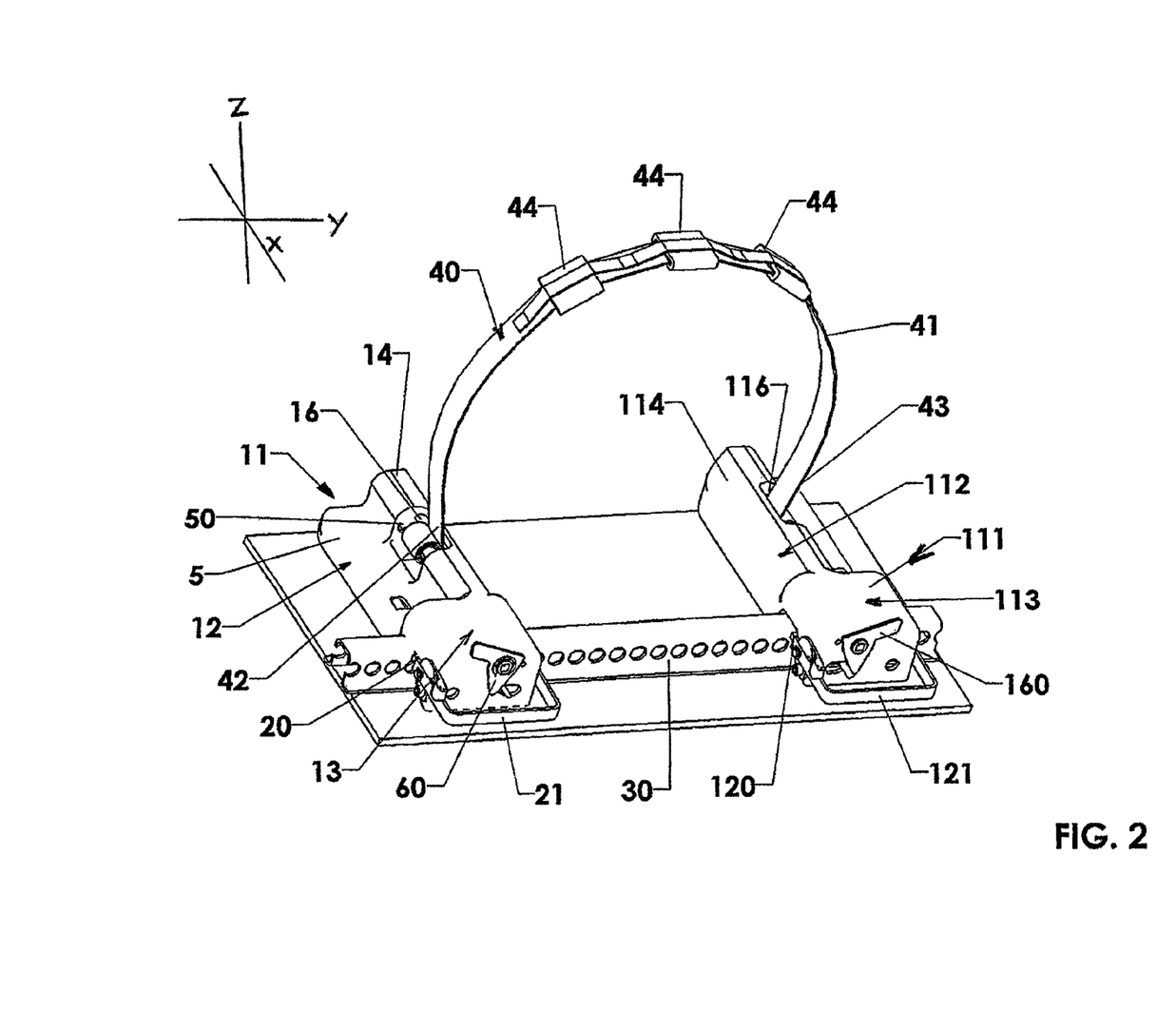
FIG. 2 is a schematic illustration, in a top perspective view, of a hookless harness, opposed straps of which are operatively connected to the front and rear active chocks, showing that the lower portions of each of the straps, when tightened around the tire (not shown), is inclined toward the vertical through the center of the tire, and tangential relative to the tire's tread (not shown).

Referring to the drawings, and particularly to FIGS. 1 and 2, there is shown a "low-drag" fender having front and rear portions FF and RF respectively defining a wheel-well in which a wheel W is located. As is evident, the periphery of the fender is adjacent the periphery of the tread of the tire leaving a clearance of less than 6.35 cm (2.5"). The lower edge of the fender, above deck D on which the wheel rests, is less than 15.0 cm (5.9") above the deck D.

A wheel chock assembly, indicated generally by WC, includes a pair of first (front) and second (rear) active chocks, indicated generally by reference numerals 11 and 111 respectively, as they would be positioned beneath a car, chocking a tire T between them. Each chock 11 and 111 is locked with first and second locking means 20 and 120 respectively, to a chock-rail 30 fixed to the deck D, each chock in a location chosen so as to contact and snugly restrain the tire T between them. The heads of pins 71, 72 (see FIG. 7) of the locking means 20 are inserted into through apertures in the rail. For greater stability and strength, the heads of the pins are spaced apart by two intervening apertures.

The chocks 11 and 111 are connected by a hookless wheel harness 40 placed over the tread of tire T, which harness includes a strap 41 having front and rear terminal ends, 42 and 43 respectively, pending on opposite sides of a tire. Strap 41 is preferably provided with plural tire-engaging blocks with cleats 44, the blocks suitably secured to the strap at spaced-apart locations chosen to restrain the tire at several points on its upper circumference. The strap 41 acquires an arcuate configuration conforming to the surface of the tire and when the opposed ends 42, 43 are tightened in the opposed chocks, the ends acquire a near-vertical position within the safe zone, the lower portion of each strap being inclined toward the vertical center line through the wheel, and each spaced apart from the periphery of the wheel-well. The lower portion of each strap is that portion which commences at a position at or below a point defined by the intersection of the tangent at the wheel's horizontal center line and the tangent at the torque tube nearest the wheel surface, and includes a point on the strap wound on the torque tube. When the ends of the strap are wound around the torque tube, the strap is tightened over the tire so that the strap is in contact with more than half the circumferential surface of the tire.

To ensure that each lower portion of the strap is as far away from the periphery of the fender as possible, when using a pair of active chocks, each end of the strap is wrapped around its torque tube, starting on the surface of the tube nearest the tire. Each strap when tightened, lies at an acute angle measured from the vertical, typically in the range from 1 degree to 35 degrees, depending in part upon the size of the tire, the strap lying in a plane including the point where the strap tangentially meets the tread and being inclined at the acute angle towards the vertical center line through the wheel. When using one active chock and an anchor chock, one end of the strap is wrapped around the torque tube of the active chock, starting on the surface of the tube nearest the tire; the other end is provided with a hook 245 which is hooked around the rod 250 of the anchor chock 211 (see FIG. 9).

Because a harness-tightening and loosening mechanism 160 used on chock 111 has components corresponding to those used by the mechanism 60 in chock 11, the reference numerals used are the same; key components have identical functions except for being constructed differently, so as to, in combination, coact to provide rotation of the torque tube in one chock opposite to that of the other. With that exception, the components used in each chock 11 and 111 are identical, and reference numerals identifying components in chock 111 are given reference numerals which include the additional numeral "1" solely to specify that the component belongs to chock 111 and not chock 11. An anchor chock is designated with the reference numeral 211. For clarity, and to avoid cluttering the drawing, reference numerals are not provided on all components of either chock 111 or anchor chock 211, it being understood that their structural body components correspond to those of chock 11; and the mechanical components of chock 111 correspond to those of chock 11.

Front terminal end 42 of the strap is windably trained on a first torque tube 50, a portion of which is visible in the window 16 in the upper portion 14; and rear terminal end 43 is windably trained on a torque tube 150 (not visible), on a portion of the tube exposed in window 116 of the upper portion 114 of the stepped-box portion 112. To wind a strap onto the torque tube, the torque tube is manually released for rotation, and an end of the strap is inserted into a slit 57 (see FIG. 6) in the torque tube. The drive-stub of a ratchet is inserted into a recess 58 (see FIG. 6) in the end of the torque tube and the torque tube is rotated to tighten the strap.

Each chock 11 and 111, each having an open bottom, is locked to the chock-rail 30 with a locking mechanism 20 and 120 respectively, but only the locking handles 21 and 121 being clearly visible.

Torque tube 50 is rotatable in a clockwise direction by a tensioning and loosening means indicated generally by reference numeral 60, so that front terminal end 42 is first wound on the torque tube's surface nearest the tire (not shown); and, torque tube 150 (not visible) is rotatable in a counter-clockwise direction by a tensioning means indicated generally by reference numeral 160, so that rear terminal end 43 is also first wound on the torque tube's surface nearest the tire.

It is critical that, viewed from the front chock's heel locked to the chock-rail, in an inward direction (x-axis or transverse axis at right angle to the rail), the first torque tube (in the front or left chock) be rotated in a clockwise direction to tighten the first strap which begins being wound on the first torque tube's surface nearest the surface of the tire. Analogously, viewed from the rear chock's heel locked to the rail, in an inward direction (x-axis) at right angle to the rail, the second torque tube (in the rear or right chock) is rotated in a counter-clockwise direction to tighten the second strap which begins being wound on the second torque tube's surface nearest the surface of the tire. In each case, the strap is wound on the torque tube in a near-vertical position, each strap converging towards the vertical centerline through the wheel, so that each strap clears the inner panels of the wheel-well.

Each chock is locked to the chock-rail by stepping on the locking handle of the locking mechanism; each strap is tightened by ratcheting the torque tube; tension on the straps may be quickly and easily released by stepping on the foot lever of the ratchet wheel assembly, as described above, then manually unlocking the locking handle prior to disconnecting the harness.

One skilled in the art will know that the strength and rigidity of a chock body is critical to reliable performance of a wheel chock. Though the prior art has suggested the use of any moldable polymer or castable metal, testing numerous materials for making the body culminated in the choice of only aluminum or magnesium and alloys thereof, and substantially fully polymerized "engineering plastics". Among the engineering plastics Xenoy® DX 5720 is most preferred. Xenoy® plastic is an alloy which is a blend of semi-crystalline polyester, typically polybutylene terephthalate, (PBT), or polyethylene terephthalate (PET), and polycarbonate. The alloy is marketed by General Electric Company. This alloy is eminently practical, and meets current AAR standards. Light metal chock bodies are presently uneconomical. NYRIM® 1000, marketed by DSM RIM Nylon Inc., is a polyurethane-modified nylon, which polymerizes in the mold. It does not provide the requisite strength and rigidity in a chock body which meets the requirements of the safe zone and the deck zone, and which will be used to chock "low drag" vehicles.

Figure 3:
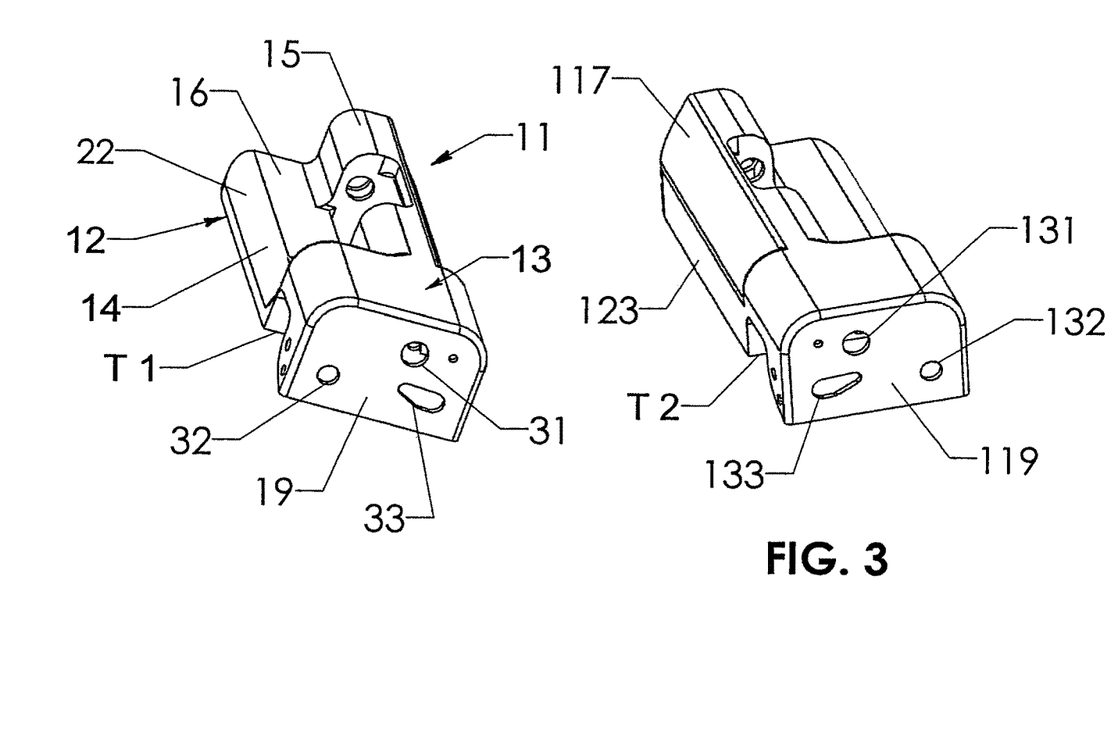
FIG. 3 is a schematic illustration, in a top perspective view, facing both chock-rail and the wheel (not shown here, but see FIG. 1), of an assembly of a pair of monolithic bodies, one (the first) to be fitted with the mechanisms to function as a left (front) active chock, the other (the second) to be fitted as a right (rear) active chock; each body has a stepped-box portion and a rectangular box-shaped portion; a rectangular box-shaped portions of each body is to be fitted over the chock-rail (not shown); as is evident, one monolithic body is a mirror-image of the other.

Referring to the pair of bodies shown in FIG. 3, and particularly to chock body indicated generally by reference numeral 11, it is seen to have a generally rectangular, elongated, stepped-box portion 12 integrally formed with a relatively short, terminal rectangular box portion 13 referred to as the "heel". Stepped-box portion 12 includes a lower portion 14 and an upper portion 15 referred to as a "hump" which transitions vertically from a relatively wide planar surface 16 on lower portion 14, and falls off on the other side to a tire-engaging "chocking" surface 17 (visible as 117 on the right body 111).

One (interior relative to the chock-rail) end of the hump 15, referred to as the "toe", terminates in an open inverted U-shaped channel 18 (see FIG. 4) defining the hump in which the torque tube is housed; exterior rectangular wall 19 of the heel 13 (and of the monolithic body) is rounded at its upper corners and is provided with through-apertures 31, 32, and 33. Aperture 31 is for insertion of torque tube 50 (not shown) so that it lies above the chock-rail; aperture 32 is left over from a molding convenience and is unused; aperture 33 is for insertion of a locking pawl 35 (see FIG. 7) which is a locking mechanism for tightening the strap of the wheel harness, locking it when taut, and manually releasing torque tube 50 for rotatability, if desired.

Lower portion 14 includes a low vertical side-wall 22 flowing upward into the generally planar surface 16; upper portion 15 continues vertically up from planar surface 16 and arcuately defines the hump. The other side (with reference to a vertical plane through the hump) of the upper portion 15 provides the tire-engaging surface 17 (not seen but shown as 117 in body 111) which transitions into the vertical sidewall 23 (not seen but shown as 123 in body 111; also, see FIG. 4) of the lower portion 14, the sidewalls 23 and 123 being adjacent the tire T to be restrained. Chocking surfaces 17 and 117 are each inclined at an angle in the range from about 45 degrees to 55 degrees. relative to the longitudinal axis, but in opposite directions, so as to contact and restrain a tire in contact with each inclined surface. Sidewalls 22 and 23 are parallel, and together define the transverse peripheral walls of the body 11. Each heel 13 is provided with a channel T1 and T2 for mounting each chock to the rail 30.

About the midpoint of the upper portion 15, intermediate the toe and heel, upper portion 15 is provided with a window 24 the lower edge of which is at the line where the planar surface 16 transitions into the hump 15. One end (front terminal end) 42 of harness 40 is inserted through the window 24 and wrapped around the first torque tube 50. Analogously, the rear terminal end 43 of the harness 40 is inserted through window 124 (see FIG. 4) in rear chock body 111 and wrapped around the second torque tube 150 (not shown).

Figure 4:
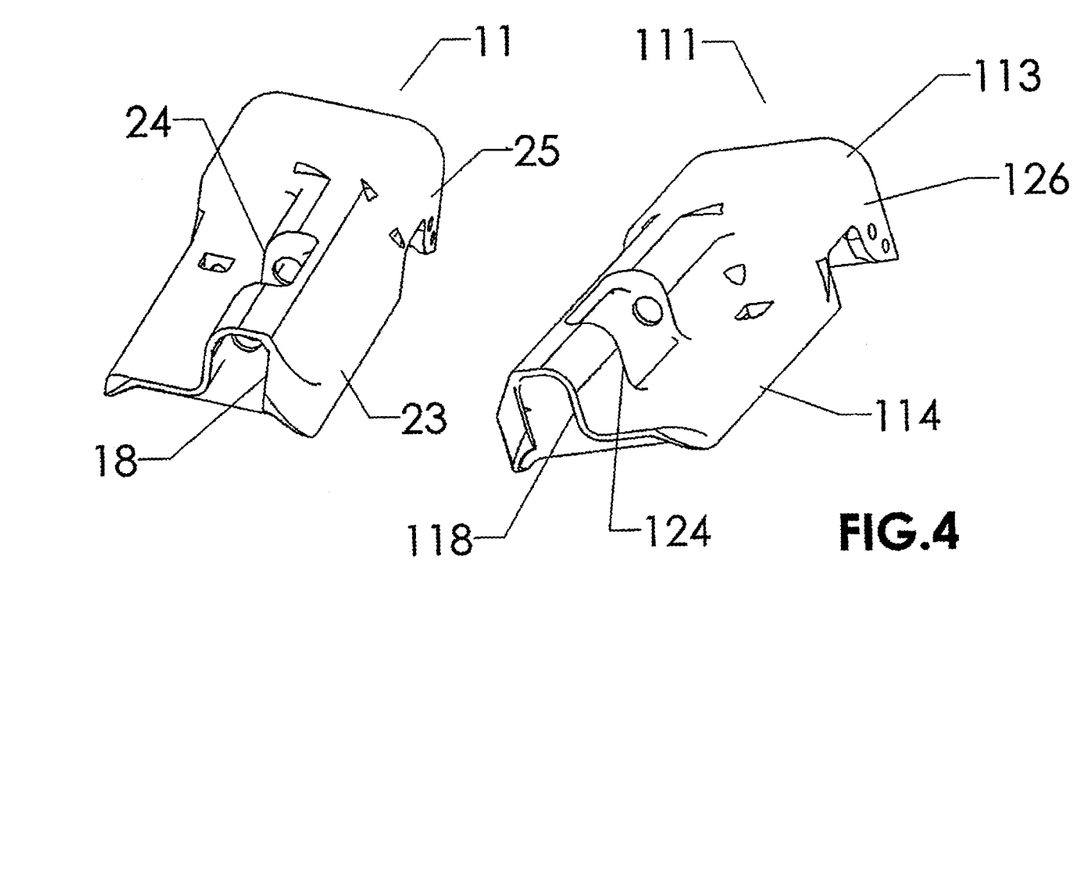
FIG. 4 is a schematic illustration, in a top perspective view, from behind the chock-rail and the wheel (not shown here, but see FIG. 1), of the assembly shown in FIG. 3, showing the open end of the stepped-box portion which includes an inverted U-channel common to both the upper and lower portions of the stepped-box portion, forming the "hump" in the stepped-box portion.

Referring further to FIG. 4, and to chock body 11 in particular, vertical sidewall 23 of the lower portion 14 is coplanar with near (adjacent the tire) side-wall 25 of the heel 13; sidewall 23 of lower portion 14 (not visible) is coplanar with far sidewall 26 (not visible, distal relative to the tire) of heel 13; and, and referring to chock body 111 in particular, vertical sidewall 114 of the lower portion 14 is coplanar with the far (distal relative to the tire) end-wall 126 of the heel 113. Each heel 13 and 113 is provided with a longitudinal tunnel T1 and T2 respectively, adapted to receive the standard mounting chock-rail 30 which extends longitudinally and is welded to the floor of the carrier.

Figure 5:
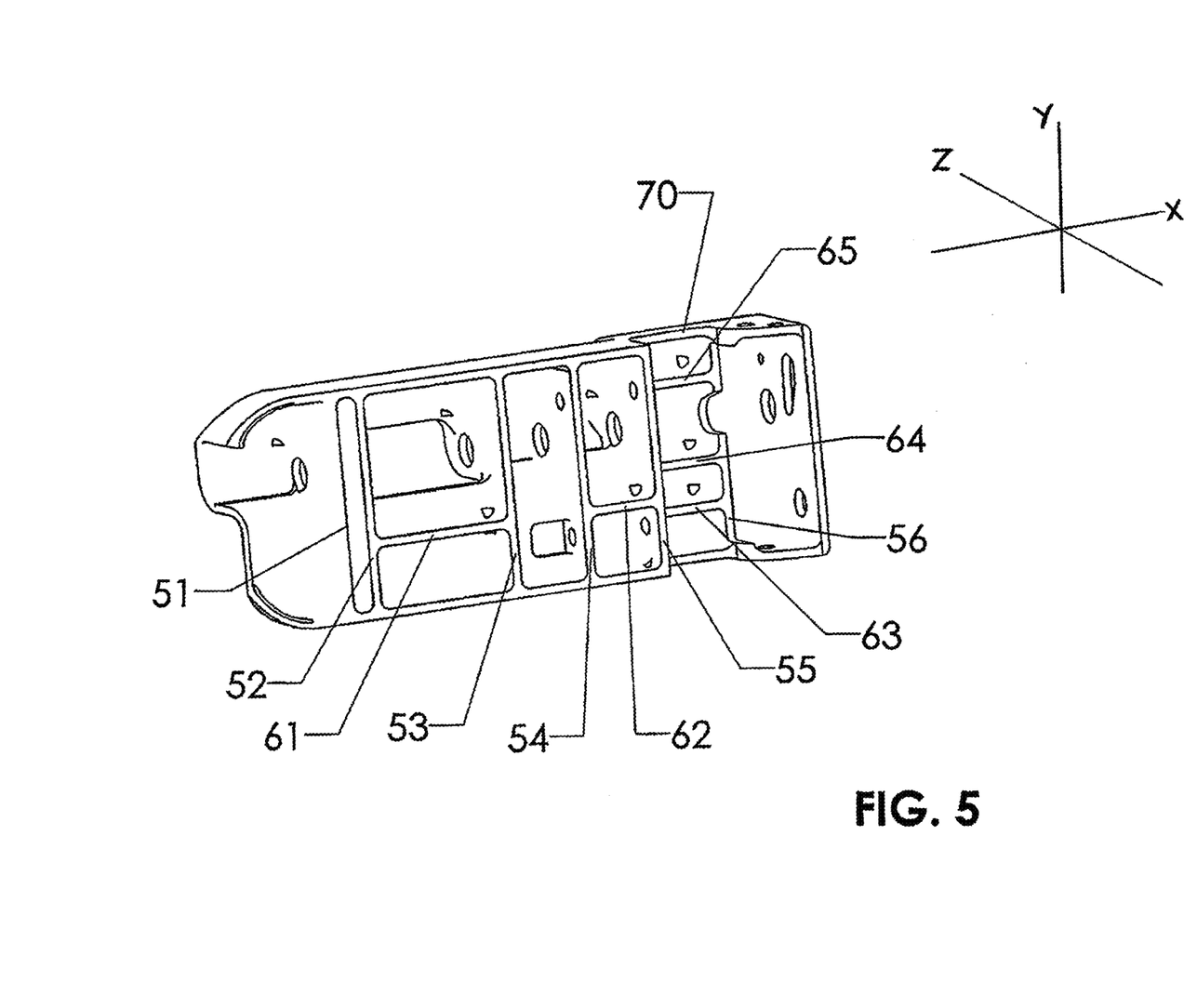
FIG. 5 is a bottom perspective view of the left body in FIG. 3 (the front chock), after the body is rotated about the x-axis (transverse axis) 90 degree, showing a network of transverse and longitudinally extending webs, all of which are vertical, and the various through-apertures in the webs, in which apertures the torque tube and locking mechanisms are to be inserted.

Referring to FIG. 5, there is shown a network of vertical webs which, in combination provide support for the torque tube (not shown) and strength and rigidity of the chock body 11. Analogously, webs are provided in chock body 111, the webs in body 111 being mirror-images of those in body 11. Starting from the toe, the interior end of the hump, webs 51, 52, 53, 54, 55 and 56 are longitudinal webs connecting the sidewalls 22 and 23 of lower portion 14. Longitudinal web 55 serves as the common internal wall of the stepped-box portion and heel and provides the mounting surface for heads of locking pins which heads are to be inserted into bores in the chock-rail. All webs, except for web 56 are through-bored to journal torque tube 50. Web 56 is channeled to fit over the torque tube.

In the transverse direction, transverse web 61 connects webs 52 and 53; web 62 connects webs 54 and 55; and webs 63, 64, 65 connect webs 55 and 56 providing stiffness and strength to the channel 70 which is to be fitted over the chock-rail 30. The thickness of each web is preferably in the range from 6.35 mm (0.25") to 9.52 mm (0.375") to allow uniform cooling in the mold resulting in homogeneity of the cooled polymer which homogeneity provides the necessary strength and rigidity.

Figure 6:
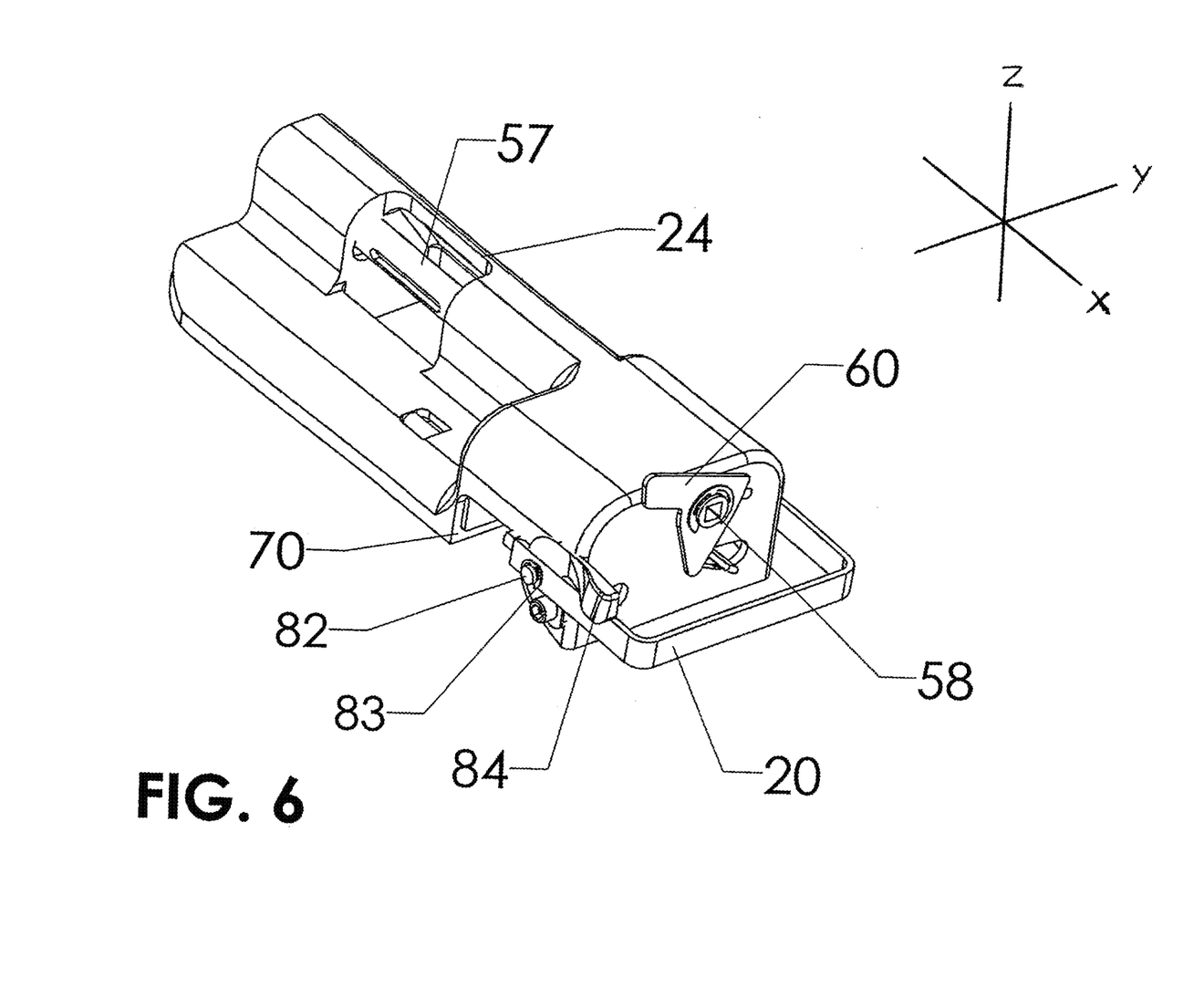
FIG. 6 is a perspective view of the completed left (front) active chock, showing the positioning of a window in the upper portion of the stepped-box portion, in which upper portion the torque tube is rotatable; also, the end wall of the heel through which the torque tube projects, and the recess in the torque tube, into which recess a drive-stub of a ratcheting wrench may be inserted; and the locking mechanism.

Referring now to FIG. 6, there is shown a perspective view of active wheel chock 11 fitted with both, (i) the tensioning means including the torque tube at the end of which is the ratchet wheel assembly including a latching and releasing mechanism, located outside end wall 19 of the heel, and (ii) the locking mechanism 20 to lock the chock to the chock-rail. This view is presented to focus the surprising effectiveness of choosing to provide a hump adjacent to the tire, allowing both the torque tube of each active chock, and the rod of an anchor chock to be positioned inside the "safe zone", adjacent the tire and inside a vertical plane drawn at the edges of the tread of the tire; such close positioning of the torque tube and rod makes it possible to have taut straps positioned with maximum clearance relative to adjacent body components under dynamic conditions encountered by the vehicle during transport. Since the maximum allowable height of the wheel chock is of 12.7 cm (5.0 ins), preferably no greater than 11.7 cm (4.6"), it is evident that the network of transverse and longitudinal vertical webs serves a critical function.

Because webs 54 and 55 are to carry locking pins 71 and 72 (see FIG. 7) which are to be inserted in the chock-rail, these webs are reinforced with metal, preferably steel, plates 73, 74, with through-bores for the pins. Pins 71, 72 are provided with threaded ends 76 which are inserted through bores in the steel plates and webs 54 and 55 before the pins and plates are locked in place by nuts 77. Washers (not visible) against which the nuts are tightened are preferably provided on the pins which have a head diameter adapted to be snugly inserted in bores of the chock-rail. Plate 73 is placed on web 55 and plate 74 being place on web 54, before the locking pins are inserted through the plates and webs, and tightened to prestress the webs 54 and 55. Currently the heads of the pins are 19.05 mm (0.75") and are spaced apart with a center-to-center spacing of 6.985 cm (2.75"), the spacing corresponding to the spacing of two bores in the chock-rail 30, the two bores separated by two bores between them.

Figure 7:
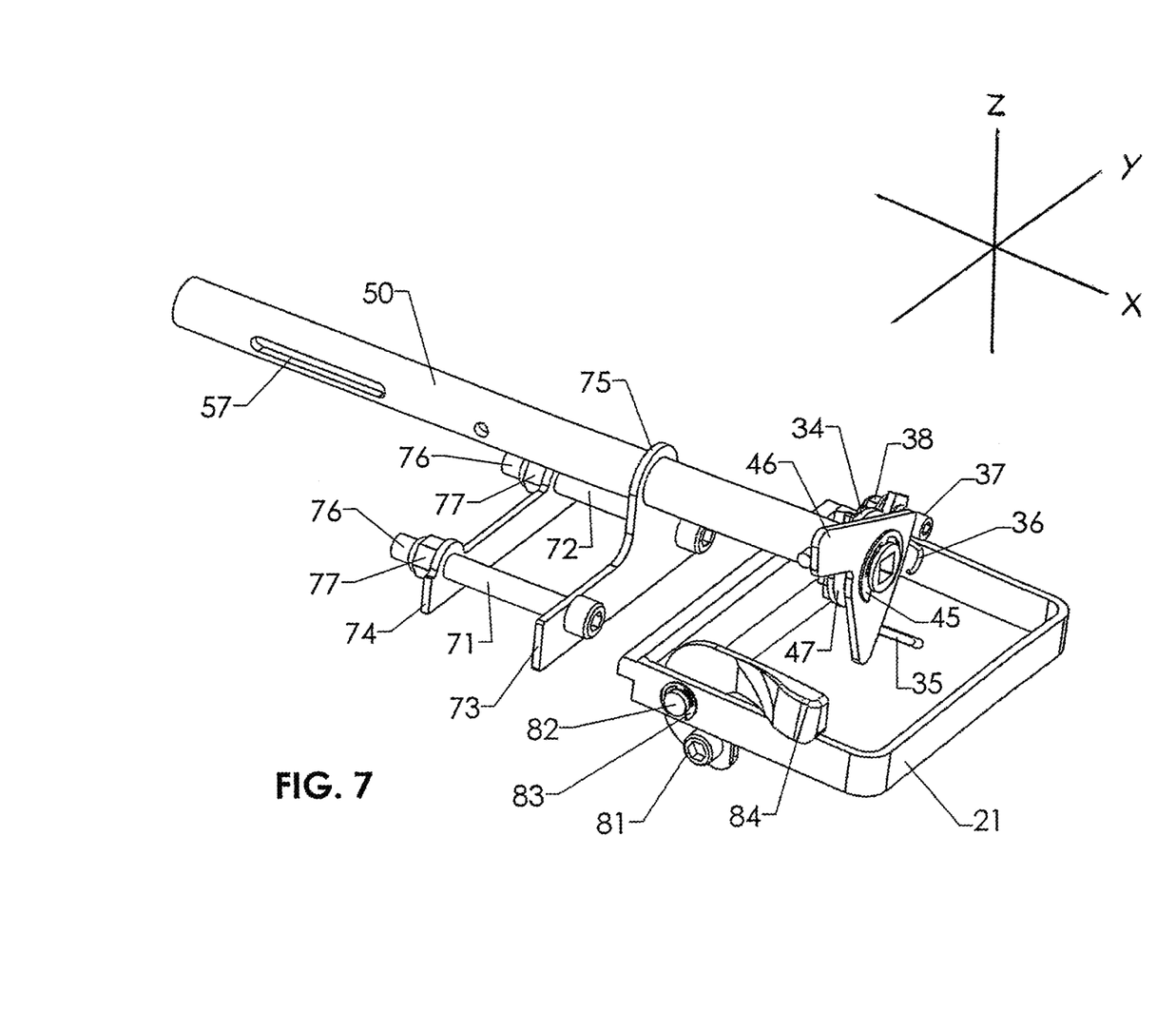
FIG. 7 is a perspective view schematically illustrating the metal components of the ratchetable torque tube and locking mechanisms as well as the stiffening plates used to help support the torque tube and, in combination with the torque tube, provide stiffness and strength to the chock body.

Plate 73 serves the dual function of providing a projecting metal ring 75 in which the torque tube 50 is journalled so as to lessen the strain on the plastic webs.

After both chocks are positioned on the rail with the pins engaged in bores in the rail, each chock is locked in place by its locking handle (21 for chock 11) which is shaped as a steel rectangle and is part of the locking mechanism which includes a handle stop pin 81 with its lock nut (not visible), shaft 82 with an external retaining ring 83 and a flexible handle lock 84 (see FIGS. 6 & 7) which also functions as a release lever. The chock is locked in place on the chock-rail by stepping on the locking handle. It is unlocked by moving the flexible handle lock inwards and releasing the handle. Details of a clock-wise rotatable torque tube and ratchet wheel assembly, and of the locking mechanism are provided in the '421 patent and are well known in the art as the '421 wheel chocks are widely used in the U.S. and Canada; these details are incorporated herein by reference thereto as if fully set forth.

The wheel harness is a key element of the restraining system, as without it, vertical displacement of the wheel held between the wheel chocks could not be controlled. Since the wheel harness must be manually deployed over the tread of the tire, it is essential that there be enough space for and installer's hands above and around the tread. Details of design of prior art multicomponent wheel harnesses were of little importance since the space required to install them was lacking. A multicomponent harness cannot be readily manually deployed over the wheel of a vehicle with the current "low drag" features. In particular, a harness required to be hooked together cannot be used with a pair of active chocks. Therefore a hookless harness was required, the preferred single strap harness 40, preferably of nylon, woven polypropylene, or some other high strength plastic material, optionally with tire-engaging blocks 44, as described hereinabove.

The harness-tightening mechanism of active chock 11 includes torque tube 50 longitudinally extending within the upper portion 15 and rotatably mounted in aligned bores in the plural longitudinal webs. The torque tube is slotted where it appears in the window 24 so as to have front terminal end 42 of the harness 40 threaded through the slot. Because the strap is to be positioned as close to the tread of the tire as possible, torque tube is rotatable clockwise to tighten the strap which begins to be wound on the face of the torque tube nearest the tire. The pawl and ratchet mechanism functions to lock the torque tube against movement in one direction and particularly against unwinding of a strap after it has been tensioned. The ratchetable mechanism (see FIG. 7) includes a left hand ratchet gear assembly 34; a right hand locking pawl 35; a locking pawl spring 36; a locking pawl shoulder bolt 37 and its nut 38; a locking pawl washer 39 behind the locking pawl (not visible); external locking ring 45; foot lever 46 and a torque tube washer 47 in front of the ratchet gear. Details of the ratchetable mechanism for tightening and loosening the straps of a wheel harness are provided in the '421 patent and are well known in the art as the '421 wheel chocks are widely used in the U.S. and Canada; these details are incorporated herein by reference thereto as if fully set forth.

Figure 8:
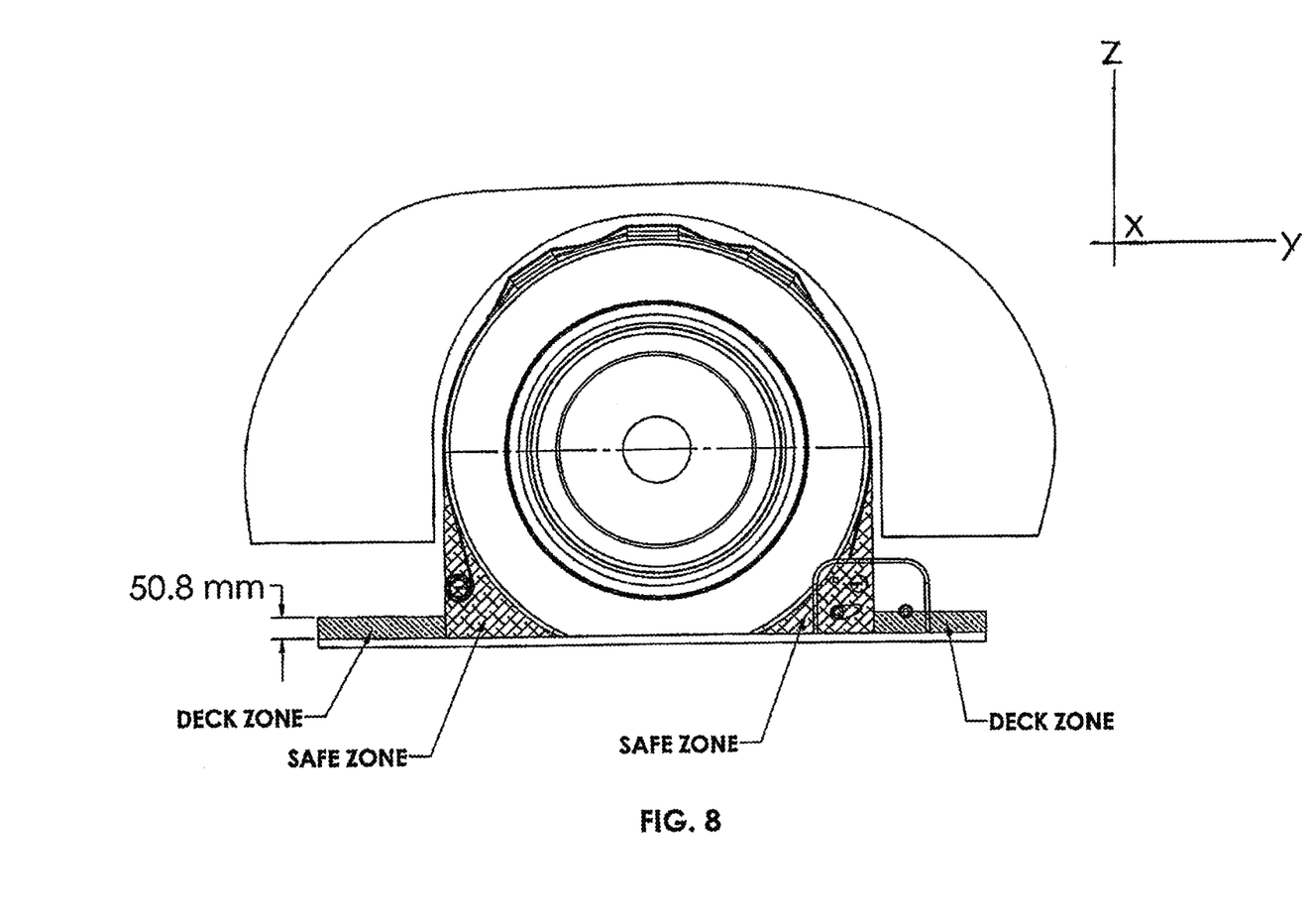
FIG. 8 is a schematic illustration of the safe zone, and the deck zone fore and aft of the safe zone, showing the limits which must be met when the wheel is secured in the wheel harness.

Referring to FIG. 8 there is illustrated a wheel of a vehicle with "low drag" features secured with an assembly of either a pair of active wheel chocks, or an active wheel chock and an anchor chock, after the wheel is secured to the deck. The left (front) chock is the active chock; the right chock may be either active or an anchor chock. It will be evident, that if desired, the locations of the active and anchor chocks could be interchanged.

A terminal end of a strap is inserted into and wound on the torque tube's surface so as to have at least one layer, typically plural layers, of strap wrapped therearound, each succeeding layer wrapped on the "wrap surface" of the preceding layer. As each layer of strap is wrapped around the torque tube, the diameter of the wrap surface increases as plural layers form a roll on the torque tube; and the force required to unwrap the strap from the roll increases. The torque tube is in the safe zone shown cross-hatched, one side of the safe zone being defined by the lower portion of the tread. The deck zone, the upper limit of which is defined by a horizontal plane 50.8 mm above the deck's surface, is shown cross-hatched differently from the safe zone. The strap's lower portion commencing at a tangent from a point at which the strap leaves the tire's tread, to a point defined by the tangent at the wrap surface nearest the tire, is always in the safe zone.

Figure 9:
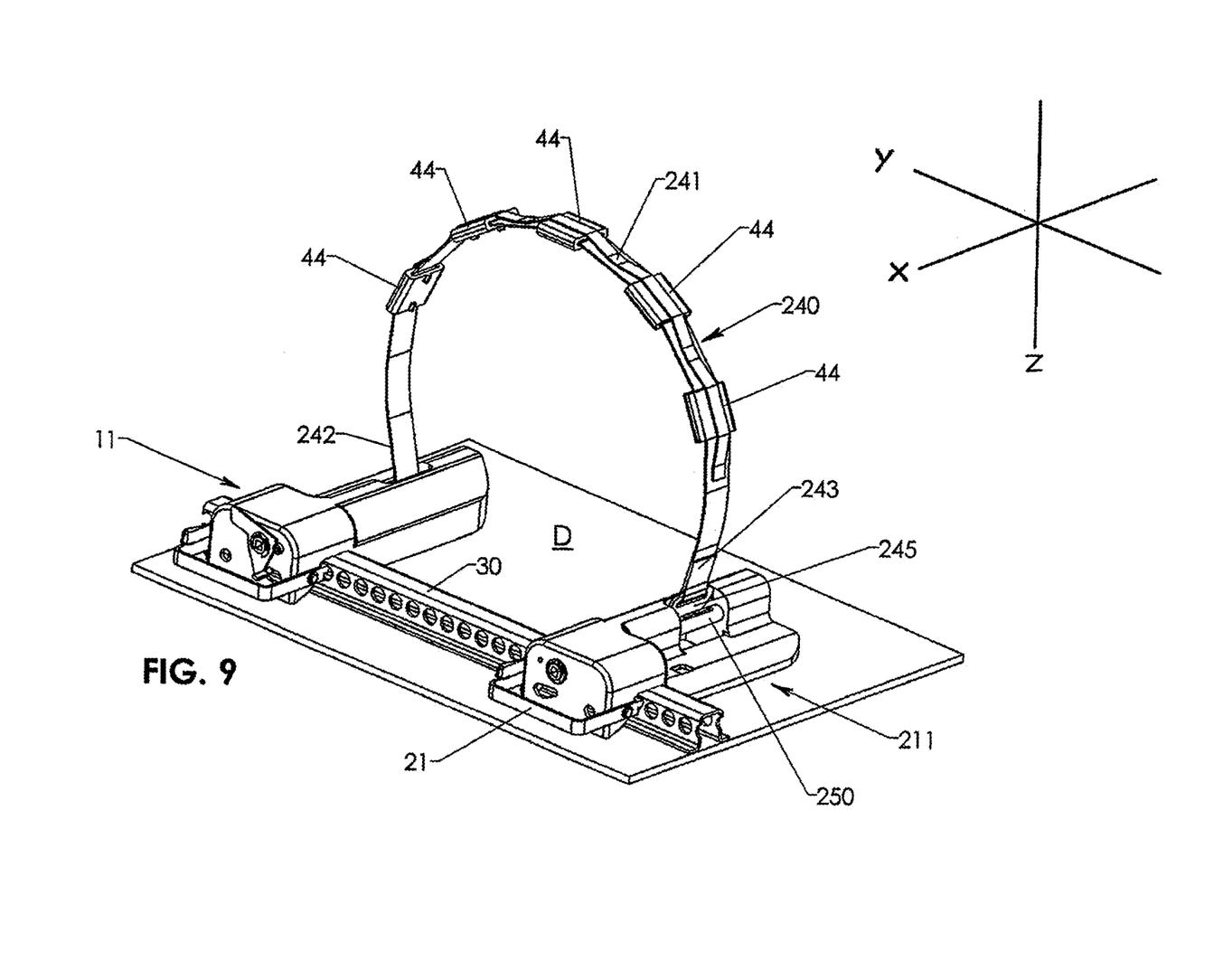
FIG. 9 is a schematic illustration, in a top perspective view, of a wheel harness having strap with plural cleated tire blocks secured intermediate its ends, each tire block having a cleat adapted to engage the tread of the tire, preferably in a valley of the tread, showing the lower portion of the strap hooked around a rod in an anchor chock locked to the chock-rail, the chock being behind the wheel (the right chock in the assembly); when the strap is tightened around the tire (not shown), each lower end is inclined toward the vertical through the center of the tire, and tangential relative to the tire's tread (not shown).

Referring to FIG. 9, there is schematically illustrated an assembly of an active chock 11 and an anchor chock 211 interconnected with a wheel harness 240 to be tensioned over a tire on the deck. The active chock 11 is the same as the active chock 11 in FIG. 2 and is locked to the chock-rail. One end (left end) 242 of the strap 241 is inserted in slit 57 of torque tube 50 (not visible) in active chock 11 and the lower portion of the strap is wrapped around the torque tube 50. The other end (right end) of the strap 241 is provided with a hook 245 which hooks around rod 250 in anchor chock 211 which is also locked to the chock-rail. Rod 250 is inserted through through-bores provided for a torque tube if the chock was to be an active chock and held in place with an external locking ring (circlip) 45 held in a circumferential groove in the end of the rod. The hook 250 is preferably hooked on the inner surface of the rod 250, the inner surface being nearest the tire, so that the lower portion 243 of strap 241 is aligned with the rod's inner surface. It is immaterial whether the rod 50 is rotatably or non-rotatably journalled in the through-bores since the anchoring function of the rod is the same and anchor chock 211 has no ratchet gear assembly. When the torque tube 50 is rotated by ratcheting it to wind up the slack, then tension the strap, plural cleated tire blocks 44 are biased against the tire, urging it against the deck.

The structure of the body of the anchor block 211 is a mirror image of the structure of body 11 except that the through-apertures for mounting the ratchet gear assembly 34 in chock 11 is not necessary. The function of the anchoring rod 250 is to provide (i) an anchor for the hook 245, and (ii) additional stiffness to the body of the chock.

Wheel harness 240 is fitted with plural cleated tire block 44, preferably at least three, and more preferably four or five, depending upon the size of the tire on the wheel. Since the right hand end 243 is anchored to rod 250, it is desired to have at least two cleated tire blocks in a valley in the tread, one block on either side of the vertical center line through 12 o'clock position on the wheel. It will be appreciated that a strap without tire blocks (cleated blocks are preferred) will not allow effective tensioning of the strap between the active chock 11 and the anchor chock 211. The more the blocks on the tread, the more effective the tensioning provided at least one block is on one side of the vertical center line, the remaining blocks being on the other side.

To install the combination of active wheel chock 11 and anchor chock 211, an installer deploys the wheel harness 240 over the tire, then locks anchor chock 211 to the rail by stepping on the locking handle 21. He then hooks the rod 250 with the hook 245 and inserts the left end of the strap into the slit of the torque tube of active chock 11. With a ratchet he then rotates the torque tube 50 clockwise in chock 11 to tighten the strap until the desired downward force in the range from about 182 Kg (400 lb) to 454 Kg (1000 lb) is exerted on the wheel.

Having thus provided a general discussion, described the overall apparatus in detail and illustrated the invention with specific illustrations of the best mode of making and using it, it will be evident that the invention has provided an effective solution to a pressing, though recent problem. It is therefore to be understood that no undue restrictions are to be imposed by reason of the specific embodiments illustrated and discussed, and particularly that the invention is not restricted to a slavish adherence to the details set forth herein.

The invention is claimed as follows:

1. A wheel chock body for a wheel chock assembly for a tire of a wheel of a vehicle on a deck of a transporter, said wheel chock body comprising:
   a heel including:
   (a) a heel top wall;
   (b) a heel first side wall connected to and extending downwardly from the heel top wall, said heel first side wall partially defining a heel first chock-rail slot;
   (c) a heel second side wall connected to and extending downwardly from the heel top wall, said heel second side wall spaced apart from the heel first side wall a first distance along a first plane, said heel second side wall partially defining a heel second chock-rail-slot; and
   (d) a heel end wall connected to the heel top wall, the heel first side wall, and the heel second side wall; and
   a stepped toe including:
   (i) a toe lower portion including:
      (a) a toe lower portion top wall;
      (b) a toe lower portion first side wall connected to and extending downwardly from the toe lower portion top wall; and
      (c) a toe lower portion second side wall, said toe lower portion second side wall spaced apart from the toe lower portion first side wall a second distance along a second plane; and
   (ii) a toe upper portion configured to receive part of a torque tube, said toe upper portion including:
      (a) a toe upper portion top wall;
      (b) a toe upper portion first side wall connected to and extending downwardly from the toe upper portion top wall; and
      (c) a toe upper portion second side wall connected to and extending downwardly from the toe upper portion top wall, said toe upper portion second side wall spaced apart from the toe upper portion first side wall a third distance along a third plane,
   wherein the third distance is smaller than the first distance and the second distance.

2. The wheel chock body of claim 1, wherein the heel and the stepped toe are integrally formed.

3. The wheel chock body of claim 1, wherein the heel and the stepped toe are a molded monolithic structure.

4. The wheel chock body of claim 1, wherein the heel is shorter than the stepped toe.

5. The wheel chock body of claim 1, wherein the heel first side wall and the heel second side wall are parallel.

6. The wheel chock body of claim 5, wherein the toe lower portion first side wall and the toe lower portion second side wall are parallel.

7. The wheel chock body of claim 6, wherein the toe upper portion first side wall and the toe upper portion second side wall are not parallel.

8. The wheel chock body of claim 1, wherein the toe lower portion first side wall and the toe lower portion second side wall are parallel.

9. The wheel chock body of claim 1, wherein the toe upper portion first side wall and the toe upper portion second side wall are not parallel.

10. The wheel chock body of claim 1, wherein the heel end wall is configured to receive part of the torque tube.

11. The wheel chock body of claim 1, wherein the heel and the toe upper portion include a common interior wall configured to receive part of the torque tube.

12. The wheel chock body of claim 11, wherein the toe upper portion additionally includes at least one interior wall configured to receive part of the torque tube.

13. The wheel chock body of claim 1, which includes a plurality of internal walls.

14. The wheel chock body of claim 1, wherein the heel is configured to receive part of a rail anchoring element.

15. The wheel chock body of claim 1, wherein the first distance and the second distance are equal.

16. The wheel chock body of claim 1, wherein the heel and the stepped toe have a maximum height of about 12.7 cm (5.0 inches) and the toe lower portion has a maximum height of about 5.08 cm (2.0 inches).

17. The wheel chock body of claim 1, wherein each of the walls has a thickness in a range from about 3.175 mm (0.125 inches) to about 12.7 mm (0.50 inches).

18. The wheel chock body of claim 1, wherein each of the walls has a thickness of no more than about 15.9 mm (0.625 inches).

19. The wheel chock body of claim 1, wherein the heel and the stepped toe are formed from a fully polymerized synthetic engineering resin.

20. The wheel chock body of claim 19, wherein the fully polymerized synthetic engineering resin includes a blend of a semi-crystalline polyester, a polyethylene terephthalate (PET), and a polycarbonate.

21. The wheel chock body of claim 19, wherein the fully polymerized synthetic engineering resin has less than about 5% monomer.

22. The wheel chock body of claim 1, wherein the toe upper portion partially defines a hook receiving area.

23. The wheel chock body of claim 1, wherein the toe upper portion partially defines a strap receiving area configured to enable a strap to be attached to the torque tube.

24. A wheel chock body for a wheel chock assembly for a tire of a wheel of a vehicle on a deck of a transporter, said wheel chock body comprising:
   a heel including:
      (i) a heel upper portion configured to partially receive a torque tube, said heel upper portion including:
         (a) a heel upper portion top wall;
         (b) a heel upper portion first side wall connected to and extending downwardly from the heel upper portion top wall;
         (c) a heel upper portion second side wall connected to and extending downwardly from the heel upper portion top wall, said heel upper portion second side wall spaced apart from the heel upper portion first side wall; and
         (d) a heel upper portion end wall connected to the heel upper portion top wall, the heel upper portion first side wall, and the heel upper portion second side wall; and (ii) a heel lower portion including:
    (a) a heel lower portion first side wall connected to and extending downwardly from the heel upper portion first side wall, said heel lower portion first side wall partially defining a heel first chock-rail slot;
    (b) a heel lower portion second side wall connected to and extending downwardly from the heel upper portion second side wall, said heel lower portion second side wall spaced apart from the heel lower portion first side wall a first distance along a first plane, said heel lower portion second side wall partially defining a heel second chock-rail-slot; and
    (c) a heel lower portion end wall connected to the heel upper portion end wall, the heel lower portion first side wall, and the heel lower portion second side wall; and
a toe including:
  (i) a toe upper portion configured to partially receive the torque tube, said toe upper portion including:
    (a) a toe upper portion top wall;
    (b) a toe upper portion first side wall connected to and extending downwardly from the toe upper portion top wall; and
    (c) a toe upper portion second side wall, said toe upper portion second side wall spaced apart from the toe upper portion first side wall a second distance along a second plane; and
  (ii) a toe lower portion including:
    (a) a toe lower portion first side wall connected to and extending downwardly from the toe upper portion first side wall; and
    (b) a toe lower portion second side wall connected to and extending downwardly from the toe upper portion second side wall, said toe lower portion second side wall spaced apart from the toe lower portion first side wall a third distance along a third plane,
wherein the third distance is smaller than the first distance.

25. The wheel chock body of claim 24, wherein the heel and the toe are integrally formed.

26. The wheel chock body of claim 24, wherein the heel and the toe are a molded monolithic structure.

27. The wheel chock body of claim 24, wherein the heel is shorter than the toe.

28. The wheel chock body of claim 24, wherein the heel lower portion first side wall and the heel lower portion second side wall are parallel.

29. The wheel chock body of claim 28, wherein the toe lower portion first side wall and the toe lower portion second side wall are parallel.

30. The wheel chock body of claim 29, wherein the toe upper portion first side wall and the toe upper portion second side wall are not parallel.

31. The wheel chock body of claim 24, wherein the toe lower portion first side wall and the toe lower portion second side wall are parallel.

32. The wheel chock body of claim 31, wherein the toe upper portion first side wall and the toe upper portion second side wall are not parallel.

33. The wheel chock body of claim 24, wherein the heel upper portion end wall is configured to partially receive the torque tube.

34. The wheel chock body of claim 24, wherein the heel upper portion and the toe upper portion include a common interior wall configured to partially receive the torque tube.

35. The wheel chock body of claim 34, wherein the toe upper portion additionally includes at least one interior wall configured to partially receive the torque tube.

36. The wheel chock body of claim 24, which includes a plurality of internal walls.

37. The wheel chock body of claim 24, wherein the heel is configured to partially receive a rail anchoring element.

38. The wheel chock body of claim 24, wherein each of the walls has a thickness in a range from about 3.175 mm (0.125 inches) to about 12.7 mm (0.50 inches).

39. The wheel chock body of claim 24, wherein each of the walls has a thickness of no more than about 15.9 mm (0.625 inches).

40. The wheel chock body of claim 24, wherein the heel and the toe are formed from a fully polymerized synthetic engineering resin.

41. The wheel chock body of claim 40, wherein the fully polymerized synthetic engineering resin includes a blend of a semi-crystalline polyester, a polyethylene terephthalate (PET), and a polycarbonate.

42. The wheel chock body of claim 41, wherein the fully polymerized synthetic engineering resin has less than about 5% monomer.

43. The wheel chock body of claim 25, wherein the upper toe portion partially defines a hook receiving area.

44. The wheel chock body of claim 25, wherein the upper toe portion partially defines a strap receiving area configured to enable a strap to be attached to the torque tube.

* * * * *